United States Patent [19]
Flaherty

[11] 3,831,717
[45] Aug. 27, 1974

[54] MOTOR VEHICLE DISC BRAKE HAVING CALIPER RETAINING MEANS

[75] Inventor: Bernard M. Flaherty, Birmingham, Mich.

[73] Assignee: Ford Motor Company, Dearborn, Mich.

[22] Filed: July 2, 1973

[21] Appl. No.: 375,996

Related U.S. Application Data

[63] Continuation of Ser. No. 159,378, July 2, 1971, abandoned.

[52] U.S. Cl............................. 188/73.3, 188/73.5
[51] Int. Cl............................................. F16d 65/02
[58] Field of Search ..... 188/73.3, 73.5, 72.4, 205 A

[56] References Cited
UNITED STATES PATENTS

| | | | |
|---|---|---|---|
| 3,612,226 | 10/1971 | Pauwels et al. | 188/73.3 |
| 3,616,879 | 11/1971 | Pauwels | 188/73.3 |
| 3,625,314 | 12/1971 | Rinker | 188/73.3 |

FOREIGN PATENTS OR APPLICATIONS

| | | | |
|---|---|---|---|
| 1,207,328 | 9/1970 | Great Britain | 188/73.3 |

*Primary Examiner*—George E. A. Halvosa
*Attorney, Agent, or Firm*—Clifford L. Sadler; Keith L. Zerschling

[57] ABSTRACT

A disc brake for a motor vehicle having an anchor plate secured to a wheel support member. A brake caliper is slidably supported on the anchor plate and straddles a brake rotor. The caliper is constructed to urge a pair of brake shoes into engagement with the braking surfaces of the brake rotor. A unique releasable retaining means secures the caliper to the anchor. In the presently preferred embodiment, the caliper and anchor have interfitting tongue and groove portions. The retaining means comprises spring metal retaining clip interposed between the tongue and groove portions.

14 Claims, 10 Drawing Figures

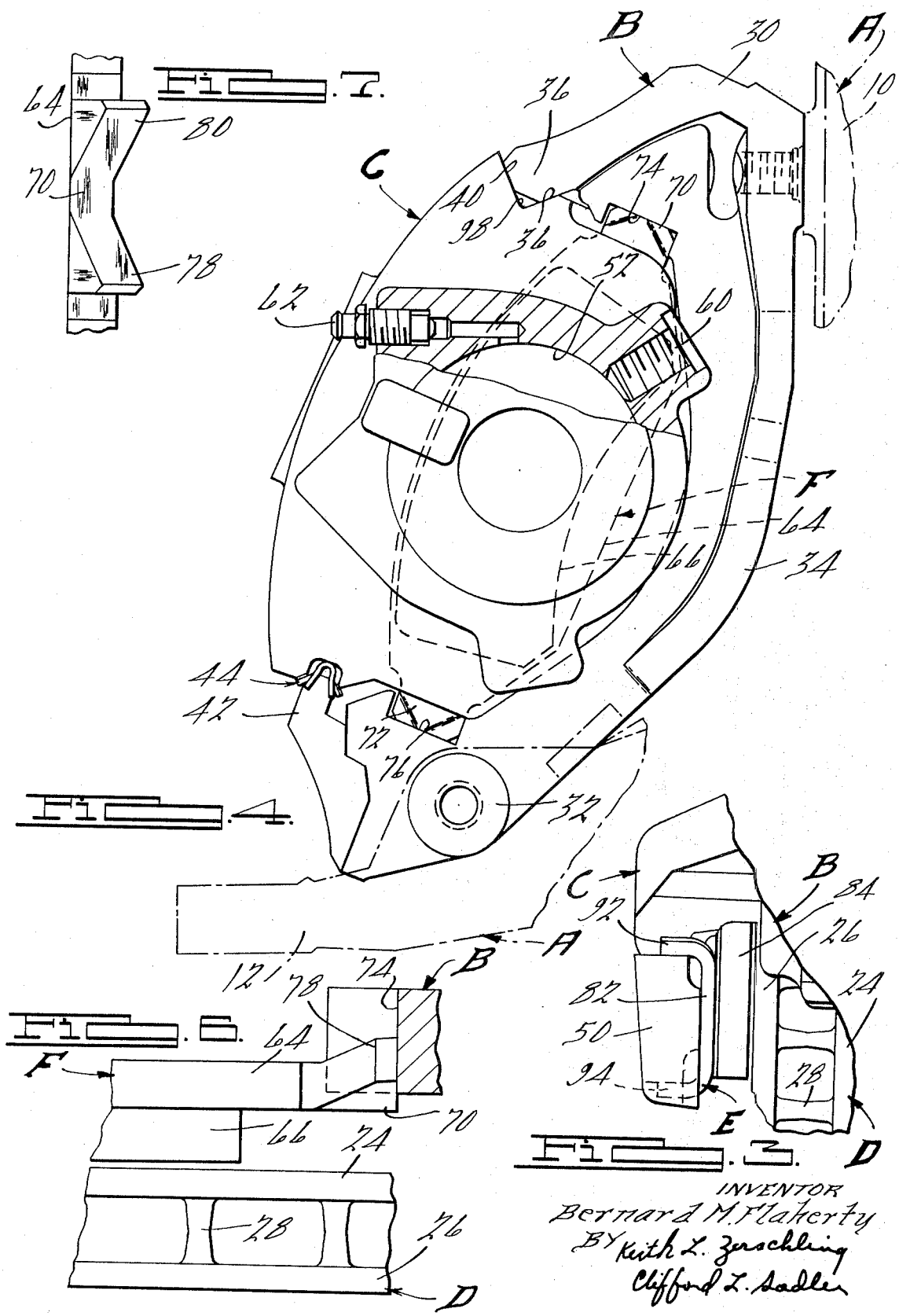

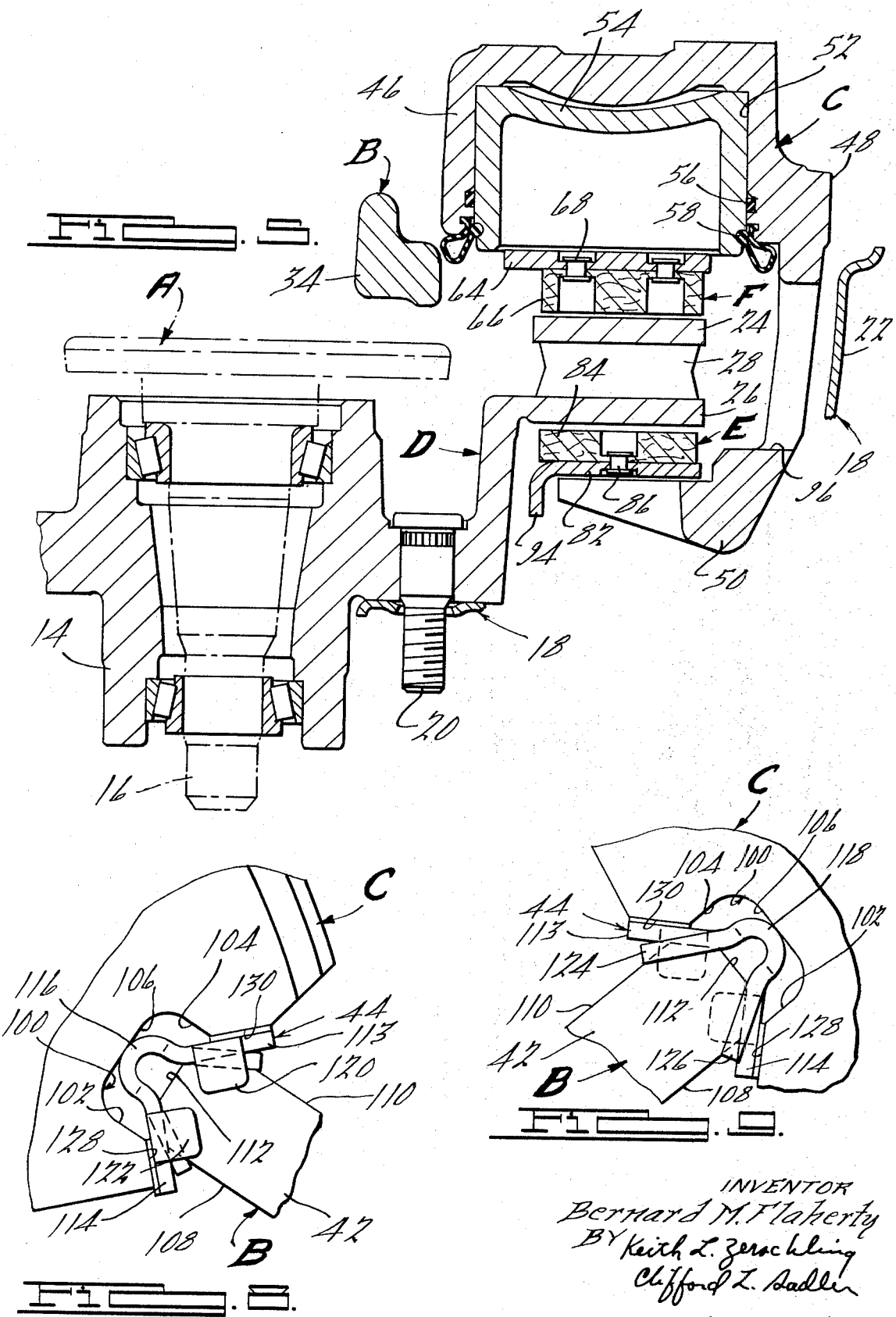

MOTOR VEHICLE DISC BRAKE HAVING CALIPER RETAINING MEANS

This is a continuation of application Ser. No. 159,378, filed July 2, 1971, now abandoned.

BACKGROUND OF THE INVENTION

The present invention relates to motor vehicle disc brakes in general, and is particularly useful in disc brakes of the floating caliper type. Among other things, the present invention is concerned with means for securing the brake caliper to the anchor plate while permitting the caliper to slide parallel to the axis of rotation of the wheel during a brake application.

It is one of the principal objects of the present invention to provide a caliper retaining means that is of simple construction and reliable in operation. It is another object to provide a retaining means that may be readily removed from the disc brake assembly to permit the ready disengagement of the caliper from the anchor.

BRIEF SUMMARY OF THE DISCLOSURE

In the presently preferred embodiment of this invention, a wheel spindle of a motor vehicle front suspension rigidly supports a disc brake anchor or torque plate. In addition, the spindle rotatably supports a disc brake rotor. A brake caliper straddles the rotor and is in slidable engagement with the anchor plate. Brake shoes are provided on either side of the rotor which are constructed to be urged by the caliper into frictional engagement with the rotor The caliper has a V-shaped groove that extends parallel to the axis of rotation of the rotor. The anchor plate has a guide member with a pair of inclined surfaces that slidably engages the walls of the V-shaped groove. The caliper also has an axially extending rectangular slot or groove. The anchor is provided with a guide support spaced from the guide member that is constructed to fit within the rectangular groove in the manner of a tongue and groove interconnection.

A releasable retaining means comprising a sheet metal spring clip engages the anchor's guide support and is interposed between the guide support and the rectangular groove. Limited clearance is provided between the width of the guide support and the width of the groove, however, the interposed spring clip prevents the support from fitting into the groove.

The spring clip exerts a spring force tending to separate the guide support and caliper whereby the V-shaped groove is urged into engagement with the guide member of the anchor plate.

In the preferred embodiment of the present invention the outboard brake shoe is carried by the caliper and, therefore, braking torque is transmitted from the outboard shoe through the caliper to the anchor plate during a brake application. During forward rotation of the rotor, the braking torque is transmitted from the caliper to the guide member of the anchor. During reverse rotation of the rotor, braking torque is transmitted from the caliper to the guide member of the anchor.

The brake caliper is removed from engagement with the anchor plate by first forcibly deflecting retaining barbs provided on the spring clip so that the clip may be slipped axially through the gap between the anchor's guide support and the caliper's rectangular groove. With the clip removed, the caliper is shifted circumferentially until the guide support is fitted within the rectangular groove. The caliper is then free to pivot about the guide support in an outward direction. Sufficient clearance is provided between the tongue and groove interconnection of the guide support and the caliper to permit the pivotal movement so that the caliper may be swung outwardly with the edges of its V-groove clearing the guide member and freeing the caliper from its engagement with the anchor.

BRIEF DESCRIPTION OF THE DRAWINGS

The many objects and advantages of a disc brake constructed in accordance with the present invention will become apparent upon consideration of the following detailed description and the accompanying drawings, in which:

FIG. 3 is an end view of a portion of the disc brake assembly;

FIG. 4 is an elevational view, partly in section, of the inboard side of the disc brake assembly of FIG. 1;

FIG. 5 is a sectional view taken along section lines 5—5 of FIG. 1;

FIG. 6 is a plan view (slightly enlarged) showing a portion of the inboard brake shoe and lining assembly, brake rotor and the anchor plate of the disc brake assembly;

FIG. 7 is an end view (slightly enlarged) of the inboard brake shoe shown in FIG. 6;

FIG. 8 is an end view (slightly enlarged) of the outboard end of the retaining spring clip with adjacent portions of the caliper and anchor also shown;

FIG. 9 is an end view (slightly enlarged) of the inboard end of the retaining spring clip.

DETAILED DESCRIPTION OF THE PREFERRED EMBODIMENT

Figure 1:
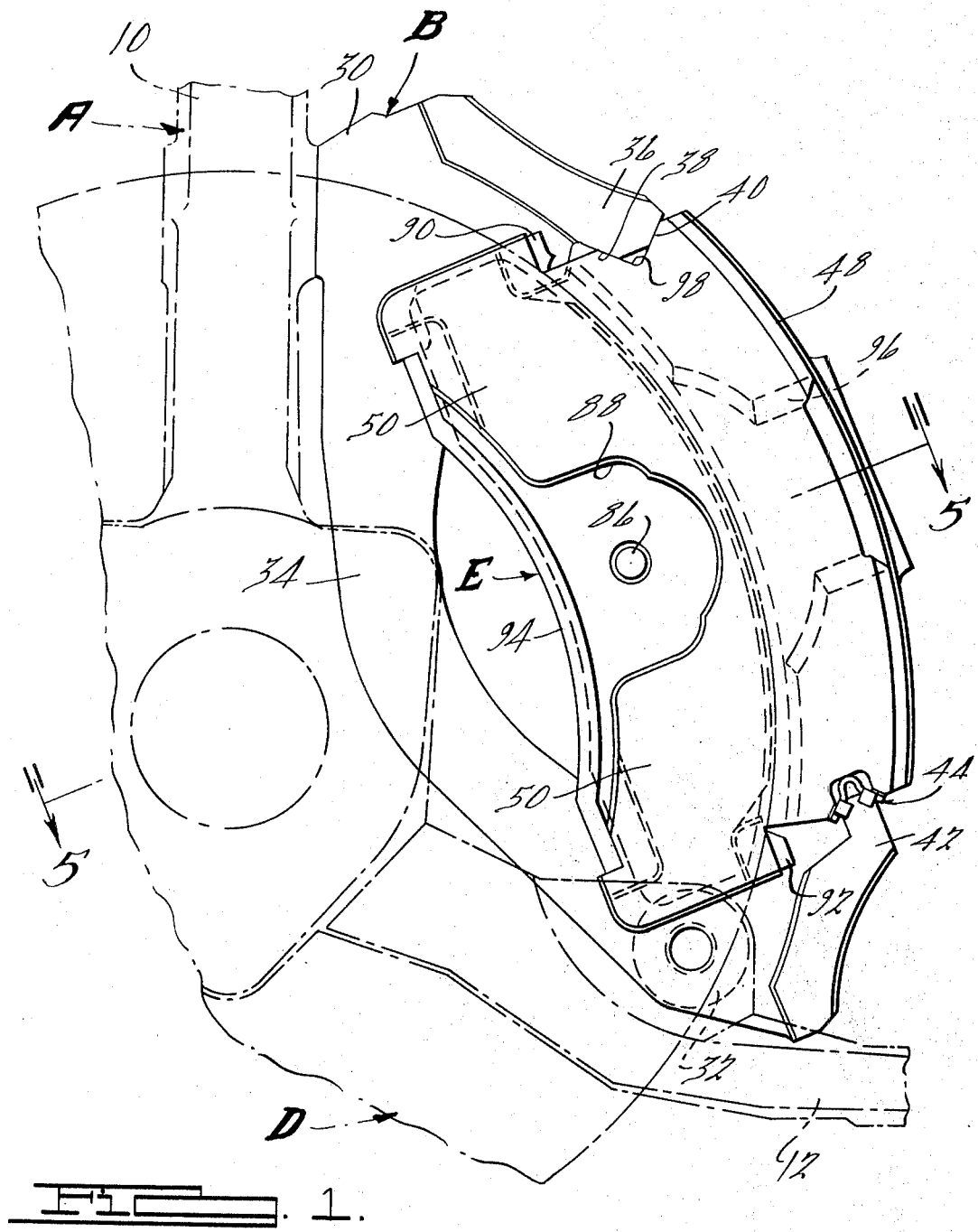
FIG. 1 is an elevational view of the outboard side of a disc brake assembly embodying a presently preferred form of this invention.

Referring now to the drawings for a detailed description of the presently preferred embodiment of this invention, FIG. 1 illustrates a disc brake assembly for the front wheel of a motor vehicle.

In FIG. 1, the assembly includes a wheel spindle A to which an anchor or torque plate B is rigidly secured. A floating brake caliper C is slidably supported on the anchor B. The caliper C straddles a brake rotor D that is rotatably supported on the spindle A. The brake assembly includes an outboard brake shoe and lining assembly E which is supported on the caliper C and an inboard brake shoe and lining assembly F which is supported on the anchor B. A hydraulic motor within the caliper C is constructed to draw the brake shoe and assemblies E and F together and clamp the brake rotor D therebetween. When the rotor D is clamped, braking torque is transmitted from the outboard shoe and lining assembly E through the caliper C to the anchor B. Braking torque exerted on the inboard shoe and lining assembly F is transmitted directly to the anchor B.

The wheel spindle A forms a part of an independent front suspension system for a motor vehicle and is constructed to be connected to upper and lower suspension arms. The spindle A includes an upwardly extending arm 10 which is designed to receive a ball joint assembly for connection with the upper suspension arm. The lower suspension arm connects to the spindle A at a point not shown in the drawing The spindle A also includes a rewarding extending steering arm 12 that is constructed to be connected to the steering linkage of the motor vehicle. The spindle A still further comprises a spindle shaft 16.

Referring to FIG. 5, the brake rotor D has a generally hat-shaped construction with a hub portion 14 that is rotatably supported on the shaft portion 16 of the spindle A by means of spaced roller bearings. A road wheel 18 is secured to the hub of the rotor D by means of circumferentially spaced bolts 20. The wheel 18 includes a rim portion 22 which is designed to support a pneumatic tire.

The rotor D includes inboard and outboard annular braking surfaces 24 and 26. The members which form the braking surfaces 24, 26 are separated by fins 28. The fins 28 are circumferentially spaced apart so as to provide radial passages between the braking surfaces 24, 26 for the flow of cooling air. Due to the spacing of the braking surfaces 24, 26 and the passages formed by the fins 28, the rotor D is of the type which is sometimes referred to as a ventilated rotor.

The anchor or torque plate B includes a first portion 30 that is bolted to the upright arm 10 and a second portion 32 that is bolted to the steering arm 12 of the spindle A. A bridging member 34 extends between the first and second anchor plate attaching portions 30 and 32. The anchor plate B includes a guide member 36 having a pair of guide surfaces 38 and 40. The guide surfaces 38, 40 are situated radially outwardly beyond the periphery of the rotor D and extend axially across its periphery. The surfaces 38, 40 support a portion of the caliper C.

The anchor B also includes a guide support 42 situated adjacent to the anchor attaching portion 32. The guide support 42 is situated radially outwardly of the rotor D and extends axially across its periphery. Guide support 42 supports a releasable retaining means 44 that engages the caliper C as will be described in greater detail later.

The brake caliper assembly C straddles the rotor D and is in slidable engagement with the anchor B. Referring to FIG. 5, the caliper C includes a casting having a hydraulic cylinder portion 46, a bridging portion 48 that spans the periphery of the rotor D and a reaction portion 50 situated adjacent the outboard braking surface 26 of rotor D.

The hydraulic cylinder portion 46 of the caliper C includes a cylinder bore 52 in which a piston 54 is slidably received. An annular seal 56 seals the clearance between the cylinder bore 52 and the piston 54. A flexible boot seal 59 is interposed between the cylinder body 46 and the piston 54 to protect the cylinder bore 52 from contamination.

As seen in FIG. 4, a port 60 passes through the body of the cylinder portion 46 and connects with the interior of the cylinder bore 52. Port 60 provides a means for connecting a hydraulic pressure source (such as a brake master cylinder) to the chamber situated between the end of the piston 54 and the end of the cylinder bore 52. Fitting 62 provides a means for bleeding air from the hydraulic chamber in a well-known manner for a well-known purpose.

The inboard brake shoe and lining assembly F includes a rigid metal brake shoe 64 to which a frictional brake lining 66 is secured by means of rivets 68. The brake lining 66 is generally smaller than the brake shoe 64. The inboard brake shoe 64 has extending end portions 70 and 72 that fit within generally rectangular guide grooves 74 and 76 provided in the anchor plate B. The rectangular grooves 74, 76 provide guide means for the displacement of the inboard brake shoe and lining assembly F in an axial direction toward the braking surface 24 of rotor D.

The inboard brake shoe and lining assembly F is interposed between the piston 54 and braking surface 24 is the rotor D with the piston arranged to engage the backside of the shoe 64. The lining 66 has a friction face that is constructed to engage the friction surface 24 of the rotor D.

End 70 constitutes the leading end of the brake shoe 64 and end 72 the trailing end as determined by the normal direction of rotation of the brake rotor D.

As seen in FIGS. 6 and 7, the corners 78 and 80 of the leading end 70 of the inboard shoe 64 are each bent along a diagonal in a direction away from the lining 66 and away from the braking surface 24 of rotor D. In the end view (FIG. 7), the end surface of the shoe 64 has a V-shaped configuration. The V-shape produced by angling of the corners 78 and 80 provides an increased *effective* thickness to the bearing surface of the shoe end 70 which engages the depth of the groove 74 of anchor B.

The trailing end 72 of the inboard brake shoe 64 has its corners bent along diagonal lines in the same fashion as the end 70 shown in FIGS. 6 and 7.

The outboard brake shoe and lining assembly E is secured to the reaction portion 50 of caliper C and comprises a stamped metal shoe 82 to which a brake lining 84 is affixed by a series of rivets 86.

Figure 2:
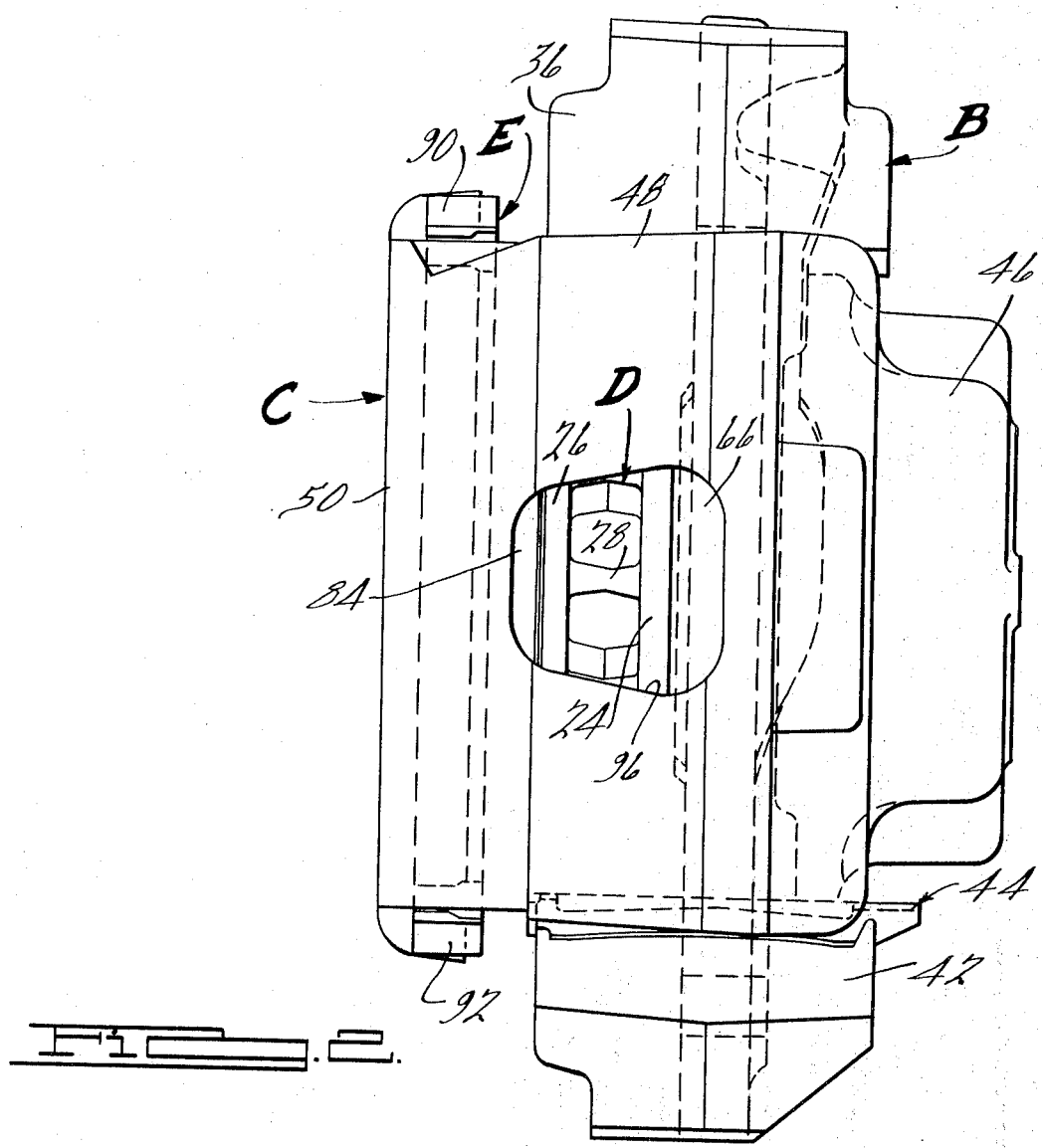
FIG. 2 is a rear elevational view of the disc brake assembly of FIG. 1.

The reaction portion 50 of the caliper C is bifurcated by a central recess 88. The outboard brake shoe 82 has edge portions that are turned or bent to form flanges which grip the bifurcated parts of the caliper reaction portion 50. The gripping flanges include bent over tabs 90 and 92 (FIGS. 1, 2 and 3) situated at the corners of the shoes 82. The lower edge of the outboard brake shoe 82 is provided with an extended flange 94. The ends of the flange 94 engage the bifurcated parts of the reaction portion 50 whereby the parts are trapped between the ends of flange 94 and the tabs 90 and 92. This flange arrangement secures the outboard brake shoe and lining assembly E to the caliper C.

The bridging portion 48 of the caliper C which spans the periphery of the rotor D and interconnects the cylinder portion 46 and reaction portion 50 is provided with a central opening 96. The opening 96 serves as a means for permitting the visual inspection of the linings 66 and 84 of the inboard and outboard brake shoe and lining assemblies F and E.

Means are provided in accordance with the present invention for slidably supporting and releasably securing the caliper C to the anchor plate B. One edge of the bridging portion 48 of caliper C is provided with a V-shaped axially extending groove 98. The angled surfaces which form the V-shaped groove 98 complement the inclined surfaces 38 and 40 of the guide member 36 of anchor plate B. In operation, the inclined surfaces of the V-shaped caliper groove 98 are in slidable supporting engagement with inclined surfaces 38 and 40.

The opposite side of the bridging portion 48 of the caliper C is provided with a rectangular, axially extending groove 100. The groove 100 is defined by parallel sides 102 and 104 and an end wall 106. The guide support 42 is formed with axially extending parallel side surfaces 108 and 110 and terminates in an end surface 112. The width of the guide support 42 between the surfaces 108 and 110 is slightly smaller than the width of the groove 100 as measured between the sides 102 and 104. The guide support 42, therefore, is able to fit within the groove 100 in a tongue and groove fashion.

In accordance with the present invention, a releasable retaining means or spring clip 44 is interposed between the anchor's guide support 42 and the caliper's groove 100. The clip 42 is connected to the guide support 44 and fits within the groove 100 and serves to maintain the support 42 and caliper C is spaced relationship. The clip 44 is constructed to prevent displacement of the caliper C with respect to the anchor B in either a radial or circumferential direction while permitting axial movement of the caliper C during a brake application.

Figure 10:
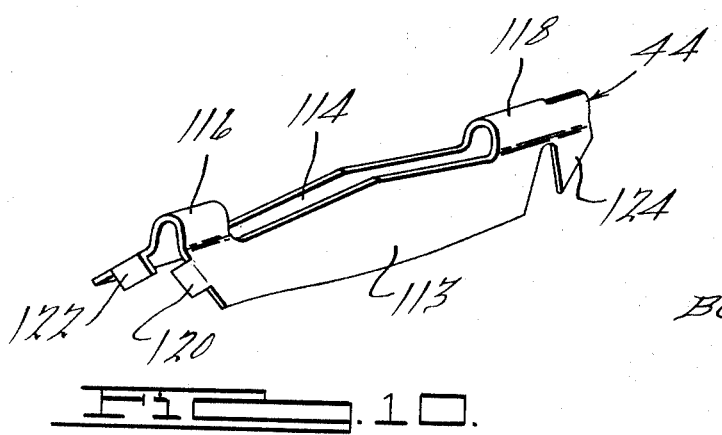
FIG. 10 is a perspective view of the spring clip of FIGS. 8 and 9.

Referring to FIG. 10, the spring clip 44 is of elongated construction and comprises side members 113 and 114 each having a generally bowed shape. Semicylindrical portions 116 and 118 interconnect the ends of the side members 113 and 114. Inwardly bent locating tabs 120 and 122 are provided on the outboard end of the bowed side portions 112 and 114. Locating barbs 124 and 126 are provided on the inboard end of the clip 44.

The intersections of the guide support surfaces 110 and 112 and of the surfaces 108 and 112 are each chamfered at a 45° angle. The clip 44 is seated with the bowed sides 113 and 114 engaging the chamfered surfaces. The distance between the tabs 120, 122 and the barbs 124, 126 of clip 44 is equal to the width of the guide support 42. Therefore, with the sides 113, 114 of the clip 44 engaging the chamfered surfaces of the guide support 42, the tabs 120, 122 and barbs 124, 126 engage the outboard and inboard sides of the support 42 (see FIGS. 8 and 9).

The surfaces of the caliper C adjacent to the groove 100 are chamfered at a 45° angle to the surface 102, 104. These chamfered surfaces are indicated by reference numerals 128 and 130. When the clip 44 is interposed between the guide support 42 and caliper C, the bowed sides 113, 114 of the clip 44 engage the chamfered surfaces 128, 130 of the caliper C and the semicylindrical portions 116, 118 engage the end wall 106 of the groove 100.

With the retaining clip 44 installed in its proper position between the guide support 42 and the caliper C, chamfered surfaces 128 and 130 are in slidable engagement with the clip 44. The caliper C is then free to move axially with respect to the anchor B during a brake application. The axially extending side members 113 and 114 of the clip 44 are slightly bowed and, therefore, a spring force is exerted which tends to separate the guide support 42 from the caliper C. This force also urges the surfaces of the caliper V-groove 98 into engagement with the surfaces 38 and 40 of the guide member 36.

OPERATIONS

The disc brake assembly is shown in the drawings in association with the left front wheel of an automobile. The brake rotor D rotates in a counterclockwise direction as seen in FIG. 1 during forward movement of the vehicle. During a brake application, pressure fluid is admitted through the port 60 into the chamber between the piston 54 and the depth of the bore 52. Pressure fluid in this chamber causes the piston 54 to move toward the brake rotor D (see FIG. 5). This action forces the inboard brake shoe and lining assembly F to move into engagement with the annular friction surface 24 of the rotor D. The inboard brake shoe and lining assembly F is guided in its movement toward the rotor D by its leading and trailing ends 70 and 72 which slide in the anchor plate grooves 74 and 76.

The bridging portion 48 of caliper C is slidably supported by the guide member 36 of anchor B and the releasable retaining means or spring clip 44 connected to guide support 42 which are disposed outwardly and across the periphery of the rotor D. When the pressure chamber of cylinder 52 is pressurized with hydraulic fluid, the piston 54 and the inboard brake shoe and lining assembly F move toward the rotor 20. The body of caliper C is displaced in the opposite direction by the pressurization of the chamber. This causes the reaction portion 50 to draw the outboard brake shoe and lining assembly F into engagement with the annular friction face 26 of rotor D. Thus, when the chamber of cylinder bore 52 is pressurized with hydraulic fluid, the caliper C is activated to cause the inboard and outboard brake shoe and lining assemblies F and E to trap the rotor D, When the linings 66 and 84 engage the rotor D, they will tend to shift laterally in the direction of rotor rotation. Rotation of the inboard brake shoe and lining assembly F will be resisted and prevented by the engagement of the leading end 70 of the shoe 64 with the depth of the groove 74 in anchor B. The outboard brake shoe and lining assembly F is secured to the caliper casting C so that when it is drawn into engagement with the rotor D, braking torque will be transmitted through the caliper C to the guide member 36.

When the vehicle having the disc brake of FIG. 1 is moving in reverse, the rotor D will be turning in a clockwise direction. A brake application under these circumstances will cause the inboard brake shoe and lining assembly F to transmit braking torque through the normally trailing end 72 to the anchor plate groove 76. Braking torque for the outboard shoe and lining assembly E will be transmitted from the caliper C through the spring clip 44 to the guide support 42 with its sides 113 and 114 being loaded in shear.

It will be noted from FIGS. 6 and 7 that the corners 78 and 80 of the leading end 70 of the inboard brake shoe 64 are angularly bent whereby the effective thickness of the shoe 64 is increased. This unique construction acts to stabilize the support for the brake shoe 64. In addition, it increases the effective thickness of the brake shoe so that when the lining 66 becomes worn, the corner portions of the end face of the leading end 70 will remain in engagement with the depth of the guide groove 74 (see FIG. 6). The trailing end 72 is similarly constructed with bent corners which provide a V-shaped end face in engagement with the guide groove 76.

The condition of the linings 66 and 84 can be determine by visual observation through the hole 96 in the bridging portion 48 of caliper C. If it is determined that the linings are worn and need to be replaced, the caliper C may be removed from engagement with the anchor B by firset removing the releasable retaining means or spring clip 44.

In order to withdraw the clip 44, an appropriate tool is used to forcibly spread the retaining barbs 124 and 126. When the barbs 124 and 126 are spread apart sufficiently to be in alignment with the space between the chamfered edges of the guide support 42 and the chamfered surfaces 128 and 130 of the caliper C, the clip 44 is axially displaced out of engagement with anchor B and the caliper C. Withdrawal of the clip 44 exposes the groove 100. The caliper C is then shifted circumferentially so that the guide support 42 fits within the groove 100 in the manner of a tongue and groove interconnection. This action exposes a gap between the V-shaped groove 98 and the guide member 36. The caliper C then may be pivoted outwardly about the guide support 42 with the edges of the V-shaped groove 98 clearing the guide member 36. After the V-shaped groove 98 is displaced outwardly of the guide member 36, the caliper C as a whole may be shifted circumferentially to withdraw the guide support 42 from the groove 100. The caliper C is then free of the anchor B.

Once the caliper C is removed from engagement with anchor B, the outboard brake shoe and lining assembly may be forcibly removed from the reaction portion 50 of the caliper C for replacement purposes. With the caliper C out of the way, the inboard brake shoe and lining assembly F may be removed in an axial direction from the guide grooves 74 and 76 of anchor B for replacement purposes.

It is to be noted that the minimum distance between the guide member 36 and the guide support 42 of the anchor B is less than the maximum width of the bridging portion 48 of caliper C so that the guide support 42 must be nested in the groove 100 in order to permit the radial removal of the caliper C after the spring clip 44 is withdrawn.

SUMMARY

In accordance with the presently preferred embodiment of this invention, a unique disc brake assembly is provided having a simplified caliper retaining means which may be readily removed to permit the caliper to be displaced in a radially outward direction from its engagement with the anchor for servicing the inboard and outboard brake shoe and lining assemblies.

The foregoing description presents the preferred embodiment of this invention. Modifications and alterations may occur to those skilled in the art which will come within the scope and spirit of the following claims.

I claim:

1. A disc brake for a motor vehicle having a stationary anchor, a rotatable rotor, a pair of brake shoe and lining assemblies disposed adjacent said rotor, a caliper straddling said rotor and connected to said anchor, said caliper having means constructed to urge said brake shoe and lining assemblies into frictional engagement with the sides of said rotor, said anchor having circumferentially spaced apart integral non-resilient first and second support portions, said caliper having spaced apart first and second caliper portions, said first caliper portion directly slidably engaging said first support portion, said second caliper portion being circumferentially spaced from said second support portion, a resilient releasable retaining means interposed between said second support portion and said second caliper portion, said resilient releasable retaining means being spaced apart from said first portions, said releasable retaining means in combination with the direct engagement of said first portions being constructed to provide the sole means preventing displacement of said caliper radially inwardly and radially outwardly, said releasable retaining means being constructed to be readily removable from its interposed position whereby said caliper may be displaced radially outwardly away from said anchor, said releasable retaining means comprising only one spring, said spring being constructed to exert a circumferentially directed spring force urging said first caliper portion in a circumferential direction into engagement with said first support portion.

2. A disc brake for a motor vehicle according to claim 1 and including:
said spring comprising a spring clip having at least one axially extending bowed portion, said bowed portion engaging one of said second portions and exerting a circumferentially directed spring force thereon.

3. A disc brake for a motor vehicle according to claim 1 and including:
said spring comprising a spring clip having a pair of radially spaced apart bowed portions that extend in an axial direction, both of said bowed portions engaging one of said second portions and exerting a circumferentially directed spring force thereon.

4. A disc brake for a motor vehicle according to claim 1 and including:
said spring comprising a spring clip having a pair of radially spaced apart bowed portions that extend in an axial direction, both of said bowed portions engaging said second caliper portion and said second support portion.

5. A disc brake for a motor vehicle according to claim 1 and including:
said spring comprising a spring clip having a pair of radially spaced apart bowed portions that extend in an axial direction, said spring clip having generally angularly shaped end portions interconnecting the ends of said bowed portions, said second portions being arranged in overlapping relationship, one of said bowed portions being loaded in compression by a radially directed force on said caliper, both of said bowed portions being loaded in shear by a circumferentially directed force on said caliper that exceeds a predetermined minimum value.

6. A disc brake for a motor vehicle according to claim 5 and including:
said resilient releasable retaining means being of one-piece construction.

7. A disc brake for a motor vehicle according to claim 1 and including:
said resilient releasable retaining means being normally axially fixed with respect to one of said second portions and slidably engaging the other of said second portions.

8. A disc brake for a motor vehicle according to claim 1 and including:
said resilient releasable retaining means being normally axially fixed with respect to one of said second portions and slidably engaging the other of said second portions, said resilient releasable retaining means being of one-piece construction.

9. A disc brake for a motor vehicle according to claim 1 and including:

one of said first portions comprising an axially extending first groove, the other of said first portions comprising an axially extending protruding first edge, said protruding first edge being seated in said first groove, one of said second portions comprising an axially extending second groove, the other of said second portions comprising an axially extending second edge positioned in said second groove in overlapping relationship, said resilient releasable retaining means being operatively interposed between said second groove and said second edge, said second groove having a greater depth than said first groove.

10. A disc brake for a motor vehicle according to claim 9 and including:

portions of said resilient releasable retaining means being loaded in shear by a circumferentially directed force on said caliper that exceeds a predetermined minimum value.

11. A disc brake for a motor vehicle having a stationary anchor, a rotatable rotor, a pair of brake shoe and lining assemblies disposed adjacent said rotor, a caliper straddling said rotor and connected to said anchor, and caliper having means constructed to urge said brake shoe and lining assemblies into frictional engagement with the sides of said rotor, said anchor having circumferentially spaced apart integral non-resilient first and second support portions, said caliper having spaced apart first and second caliper portions, said first caliper portion directly slidably engaging said first support portion, said second caliper portion being circumferentially spaced from said second portion portion, a resilient releasable retaining means interposed between said second support portion and said second caliper portion, said resilient releasable retaining means being spaced apart from said first portions, said releasable retaining means in combination with the direct engagement of said first portions being constructed to provide the sole means preventing displacement of said caliper radially inwardly and radially outwardly, said releasable retaining means being constructed to be readily removable from its interposed position whereby said caliper may be displaced radially outwardly away from said anchor, said releasable retaining means comprising only one spring, said spring being constructed to exert a circumferentially directed spring force urging said first caliper portion in a circumferential direction into engagement with said first support portion, one of said brake shoe and lining assemblies being rigidly secured to said caliper, said first support portion being located with respect to said caliper whereby brake torque is transferred directly from said first caliper portion to said first support portion upon engagement of said one brake shoe and lining assembly with said rotor when said rotor is rotating in a forward direction.

12. A disc brake for a motor vehicle according to claim 11 and including:

one of said first portions comprising an axially extending first groove, the other of said first portions comprising an axially extending protruding first edge, said protruding first edge being seated in said first groove, one of said second portions comprising an axially extending second groove, the other of said second portions comprising an axially extending second edge positioned in said second groove in overlapping relationship, said resilient releasable retaining means being interposed between said second groove and said second edge, said second groove having a greater depth than said first groove.

13. A disc brake for a motor vehicle according to claim 11 and including:

said resilient releasable retaining means being normally axially fixed with respect to one of said second portions and slidably engaging the other of said second portions, said resilient releasable retaining means being of one-piece construction.

14. A disc brake for a motor vehicle according to claim 11 and including:

said spring comprising a spring clip having a pair of radially spaced apart bowed portions that extend in an axial direction, said spring clip having generally angularly shaped end portions interconnecting the ends of said bowed portions, said second portions being arranged in overlapping relationship.

* * * * *